Feb. 16, 1932.　　G. S. HILTZ ET AL　　1,845,875
AUTOMATIC TICKER TRANSMISSION
Filed Nov. 1, 1930　　7 Sheets-Sheet 1

FIG. 1

Inventors
G. S. HILTZ
W.F. PURCELL
Eugene C. Brown
By their Attorney

Feb. 16, 1932.    G. S. HILTZ ET AL    1,845,875
AUTOMATIC TICKER TRANSMISSION
Filed Nov. 1, 1930    7 Sheets-Sheet 2

Inventors
G. S. HILTZ
W. F. PURCELL
By their Attorney
Eugene E. Brown

Inventors
G. S. HILTZ
W. F. PURCELL

Feb. 16, 1932.  G. S. HILTZ ET AL  1,845,875
AUTOMATIC TICKER TRANSMISSION
Filed Nov. 1, 1930  7 Sheets-Sheet 4

Inventors
G. S. HILTZ
W. F. PURCELL

Feb. 16, 1932.  G. S. HILTZ ET AL  1,845,875
AUTOMATIC TICKER TRANSMISSION
Filed Nov. 1, 1930   7 Sheets-Sheet 5

Inventors
G. S. HILTZ
W. F. PURCELL
By their Attorney
Eugene C. Brown

Patented Feb. 16, 1932

1,845,875

UNITED STATES PATENT OFFICE

GEORGE S. HILTZ, OF BROOKLYN, NEW YORK, AND WILLIAM F. PURCELL, OF HOBOKEN, NEW JERSEY, ASSIGNORS TO STOCK QUOTATION TELEGRAPH COMPANY, OF NEW YORK, N. Y., A CORPORATION OF NEW YORK

AUTOMATIC TICKER TRANSMISSION

Application filed November 1, 1930. Serial No. 492,802.

This invention relates to printing telegraph systems and more particularly to the transmitting mechanism and circuit arrangements therefor.

In the operation of stock quotation and other ticker systems in which the type wheels are operated step-by-step, the signals may be transmitted directly from the manually operated key-board or automatically from a storage transmitter, such as a perforated tape. In our prior Patent No. 1,711,497, granted May 7, 1929, and entitled "Current-transmission apparatus for printing telegraph and other systems", we have disclosed a ticker transmitting system employing a perforated tape transmitter in which an eleven unit code is used. This system requires a relatively wide tape and a special tape perforator and tape transmitter.

In present day high speed telegraph systems, aside from ticker transmission, it is the almost universal practice to employ a five or six unit code and the apparatus for perforating tape in accordance with such code and transmitting the signals therefrom has been developed to a high degree of perfection. It is one of the objects of the present invention to provide a ticker system employing a tape or other storage transmitter operating on a five or six unit code and capable of setting into operation mechanism for transmitting ticker or step-by-step signal impulses corresponding to the characters appearing on the perforated tape.

Another object of the invention is to increase the speed and reliability of operation of ticker systems and to simplify the construction of the transmitting apparatus and to permit the use of standardized equipment.

Other objects and advantages of the invention will hereinafter appear.

We have illustrated the invention as applied to a "one wire" ticker telegraph system employing tickers of the type disclosed in the prior patent of George S. Hiltz, No. 1,085,124, granted January 27, 1914. In that receiver a type wheel is employed for printing the letters of the alphabet, punctuation marks, numeral digits, fractions and other desired symbols, the characters being arranged in two rows or series on the type wheel with half the characters, as the letters and letters period in one row and the remaining characters including the figures and figures period in the other row. A period is used after every word or number in lieu of a blank space and advantage is taken of this use to select either row of characters on the ticker type wheel for printing of the subsequent group of characters. For instance, suppose that "ERIE. PF. 43. STEEL. 127½" is to be printed. After ERIE is printed, the "letters period" is transmitted, since the characters PF (signifying preferred) next to be transmitted are letters and hence the same row of characters on the type wheel is used as was employed for printing ERIE. The characters following PF are numerals, however, and hence must be printed from the other row of type wheel characters. Accordingly after PF the "figures period" is transmitted. This latter, by means such as described in the aforesaid Hiltz Patent No. 1,085,124, brings to the printing position the period which is in the figures row and causes the figures row to be selected for the succeeding group of characters. Having printed "43", the operator must shift back to the letters row to print the word "STEEL" and, therefore, after the "43" the letters period is again transmitted. Following the word "STEEL", the figures period is again transmitted so that the following numerals "127½" can be printed.

The type wheel is stepped around to the printing position by transmitting over the line a succession of current impulses of alternating polarity, the number of such impulses required in each instance being variable, of course, and dependent upon the previous setting of the type wheel. The printing is effected by a prolonged impulse transmitted over the same line, as is well understood in single wire ticker operation.

In accordance with our present invention we control the transmission of the alternating current impulses by a transmitter of the sunflower type having segments corresponding to each printing position of the type wheel, the operation of the sunflower being controlled by means of a multi-contact selector, in turn controlled by a tape transmitter by means of a tape, perforated in accordance with a fixed character code, preferably of six units.

The invention includes the novel construction of the multi-contact selector by which the six unit character code is translated into an eleven unit code. Suppose, for example, that the selector is provided with contacts for controlling eleven distinct circuits extending from the sunflower contacts or segments. These eleven circuits may be divided into two groups, of four in one and seven in the other. By completing each of the group of seven circuits selectively in series with each of the group of four circuits, a total of twenty-eight circuit combinations may be obtained, each of which may be associated with a particular segment of the sun-flower and control the transmission of current alternations for printing an individual character.

The feeding of the tape through the tape transmitter is not uniform in speed but is dependent for each movement upon the number of impulses required to step the type wheel into each particular printing position and one of the features of our invention includes the operation of the tape feeding mechanism in step or in time with the operation of the brushes of the sunflower transmitter.

The invention also includes means for bringing the transmitter into unison with the receiving tickers, in transmitting winding impulses to the printers, and in the novel means for causing certain characters appearing in two or more places on the type wheel to be printed in the first-to-be-reached position.

The invention will be more fully understood from a detailed description of the accompanying drawings in which.

Referring to the diagrammatic views in Figures 13 and 14 the transmitting apparatus comprises the tape transmitter 20 which, through contacts 21, controls a group of six selecting magnets 22 of the multi-contact selector 23, which in turn, through its contacts 24 and through a group of seven conductors 25 and a group of four conductors 26, extending to the rings of the sunflower 27, as will appear more fully hereinafter, control the operation of the shaft 28 of the sunflower transmitter to transmit the current alternations to the receiving tickers. A unison device 29 under the control of a manual switch 30 or the tape transmitter 20 serves to transmit unison signals to the receiving apparatus to place the same in unison with the sunflower transmitter.

Figure 8:
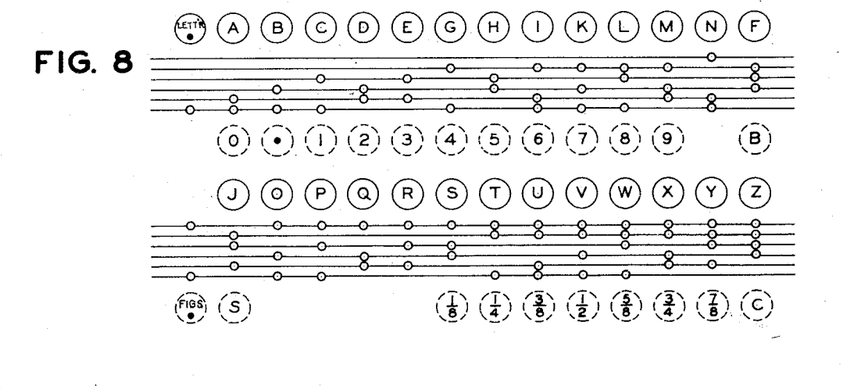
Figure 8 is a diagrammatic illustration of the six unit code employed with the perforated tape transmitter.

The tape 31 is perforated in transverse rows in accordance with a six unit code. The code employed is somewhat different from that used in regular multiplex and start-stop printing telegraph systems and is based on four groups of seven selecting conditions providing twenty-eight different selecting combinations. By way of illustration the characters appearing on the letters row of the type wheels of the receiving tickers may be arranged in twenty-eight angular positions in the following order and in four groups: letters period, A, B, C, D, E, G; H, I, K, L, M, N, F; blank J, O, P, Q, R, S; T, U, V, W, X, Y, Z. The code for the first group of seven angular positions of the type wheel may comprise perforations in the tape disposed in the following transverse positions: 1, 1 and 2, 1 and 3, 1 and 4, 2 and 3, 2 and 4, 3 and 4. The second group may comprise perforations of each of the above positions plus a perforation in the fifth position; the third group may comprise the combinations of group one in addition to a perforation in the sixth position; and the fourth group may comprise the combinations of group one with perforations in both the fifth and sixth positions. In actual practice the order of the combinations has been changed slightly and may be as shown in Figure 8. In this figure the characters appearing on one row of the type wheel are enclosed in solid circles and those appearing on the other row of the type wheel are shown enclosed in dotted circles.

The tape 31 in addition to the character code holes 32 has a central row of feed holes 33 by which it is advanced through the tape transmitter step-by-step by means of the star wheel 34, to setup character code combinations on the contacts 36 to 41 in accordance with the perforations appearing in the tape. An operating magnet 42, in response to each impulse, successively withdraws the pins 35 from the tape, advances the tape one step to bring a new row of perforations into alignment with the pins and again moves the pins into engagement with the tape to set up the new combinations on the contacts 36 to 41. The transmitter may be of any desired type as for instance that shown in patent to G. R. Benjamin, No. 1, 298,440 granted March 25, 1919, and entitled "Automatic transmitter".

The movable transmitting contacts 36 to 41 are connected to one terminal of the windings of the selecting magnets 43 to 48 respectively, by conductors 50, the opposite terminals of the magnet windings being grounded at 51. The stationary contact 53 of the tape transmitter is connected to a grounded source of potential 52. Consequently upon closing of each combination of the contacts of the tape transmitter, in accordance with the perforations appearing in the tape, the corresponding selecting magnets are energized. For instance, upon setting up of the code combination for the letter S (which has perforations in positions 3, 4 and 6) contacts 38, 39 and 41 would be closed, thus energizing magnets 45, 46 and 48 which correspond thereto. The selecting magnets operate the contacts 24 of the selector in different combinations to set up definite circuits through segments of the sunflower as will hereinafter appear.

Figure 7:
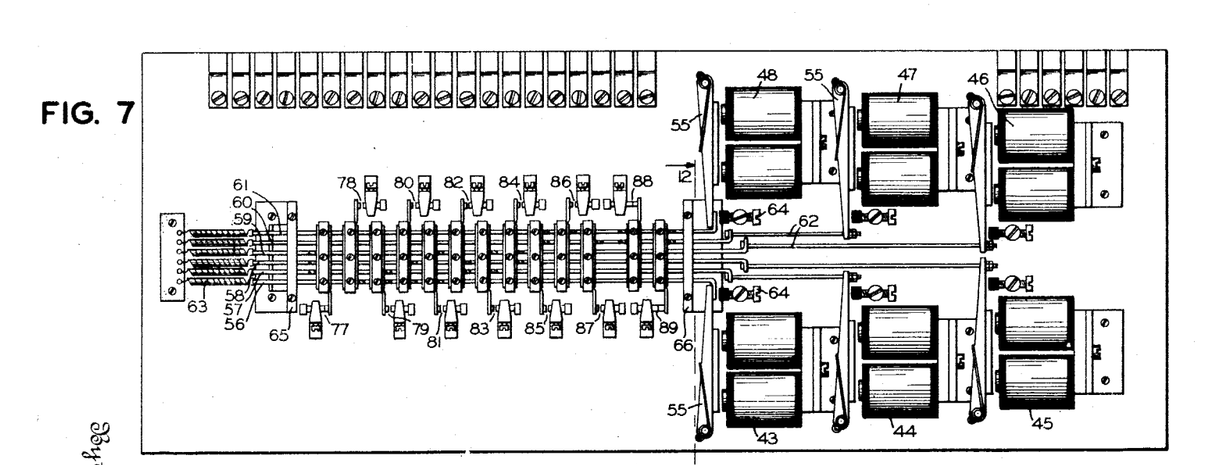
Figure 7 is a plan view of the multi-contact selector.

Referring now to Figure 7 it will be seen that the armatures 55 of the selecting magnets 43 to 48 are connected respectively to a group of six sliding code bars 56 to 61, the connection being direct in the case of code bars 56 and 61 and through the pull rods 62 in the case of the remaining code bars, so as to draw code bars to the right against the tension of springs 63. Adjustable stop members 64 limit the movement of the armatures 55 upon actuation of the magnets.

Figure 10:
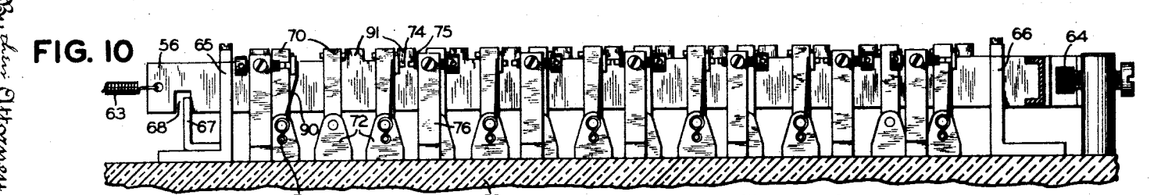
Figure 10 is a side elevation of the contact mechanism of the selector.
Figure 11:
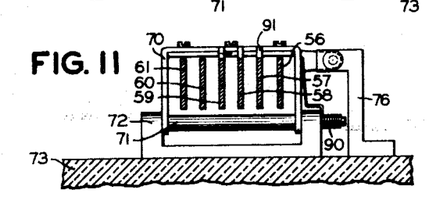
Figure 11 is a sectional view on the line 11—11 of Figure 9.
Figure 12:
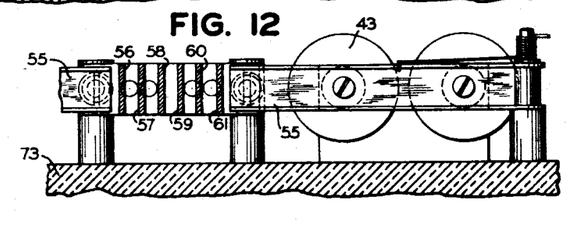
Figure 12 is a sectional view on the line 12—12 of Figure 7.

The code bars are guided in combs 65 and 66 (Figures 9 to 11) and are limited in a movement in each direction by a plate 67 extending into a slot 68, formed in the underside of each code bar.

Figure 9:
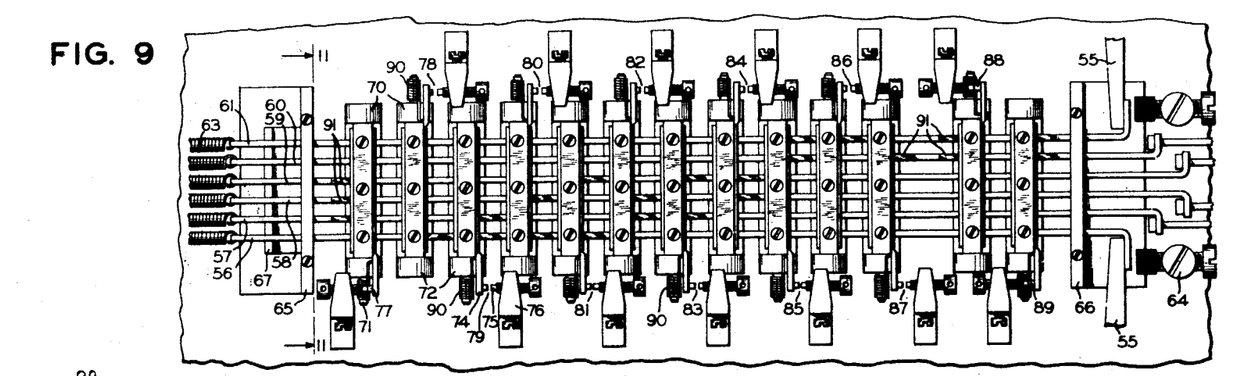
Figure 9 is a detailed plan view of the contact mechanism of the selector.

A number of bails 70 extend transversely across the code bars and are pivoted at their lower ends on pins 71 secured in U-shaped brackets 72 carried by the insulating base member 73. Each bail carries a contact member 74 at one side thereof, which is adapted to engage with an adjustable contact member 75 carried by the brackets 76. The sets of contacts 75, 76, beginning at the left of Figures 7 and 9, are numbered consecutively as 77 to 89. Springs 90 serve to bias each of the movable contacts to either open or closed position, contacts 77 and 88 being normally biased to closed position and contacts 78 to 87 being biased to open position. Contact 89 is biased towards its open position but is normally held closed as will appear below.

The code bars are provided with a number of upwardly extending lugs or wards 91 projecting between the bails 70 and serving, when the code bars are shifted to the right to open certain of the switch contacts 77, 88 and 89 and to permit certain of the contacts 78 to 87 to close under the action of the springs 90, depending upon the particular combination in which the code bars are shifted. The lugs to the left of the bail carrying contacts 77 and 88 rock the bails upon shifting of the code bars to open these contacts against the action of the springs 90. The lugs to the right of the bails carrying contacts 78 to 87 normally hold these contacts open against the action of the springs 90 and when the code bars are shifted to the right permit the contacts to close. The lugs to the right of the bail carrying contact 89 normally hold this contact closed against the action of the spring 90 and permit it to open upon shifting of the code bars 60 and 61 to the right.

In the example assumed above of the code combination for the letter S in which the magnets 45, 56 and 48 were energized, code bars 58, 59 and 61 would be shifted to the right thus opening the contacts 77 and permitting the contacts 84 and 88 to close. For each different character code combination one of the contacts 78 to 84 controlling the group of seven conductors 25 (see Figure 13) is closed and one of the contacts 85 to 88 controlling the group of four conductors 26 is closed. Contact 77 serves to open the circuit including the contact 78 for certain code combinations in which the contact 78 is closed simultaneously with one of the other contacts 79 to 84. Contact 89 is likewise provided to open the circuit including contacts 86 and 87 when either of these contacts close simultaneously with contacts 85 or 88, so that the ground connection 95 is applied only to one of the circuits of group 26. Thus by closing one only of the seven circuits of group 25 and one of the four circuits of group 26, twenty-eight different combinations may be obtained which when completed in series through segments and brushes of the sunflower transmitter, control the stopping of the sunflower brushes on any one of its twenty-eight segments and consequently the printing from any of the type wheel characters.

Figure 1:
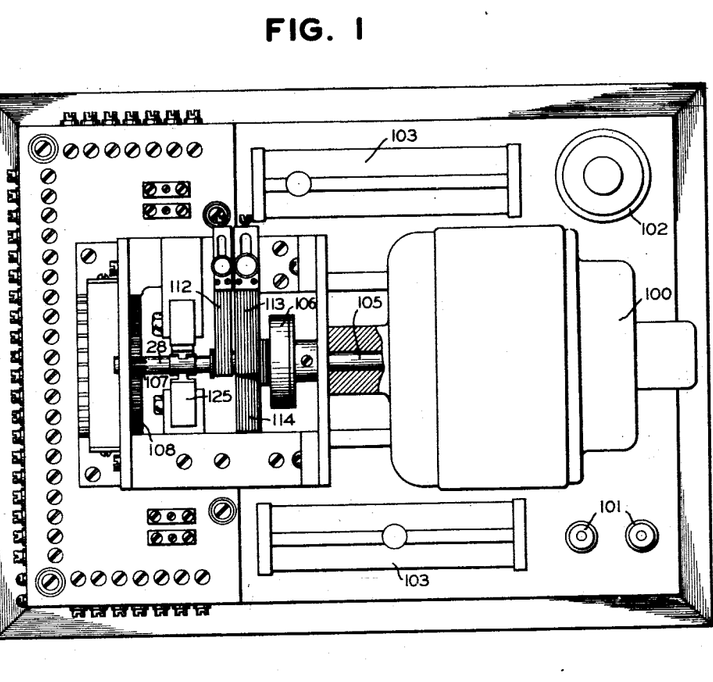
Figure 1 is a plan view of the sunflower transmitter.
Figures 2, 15:
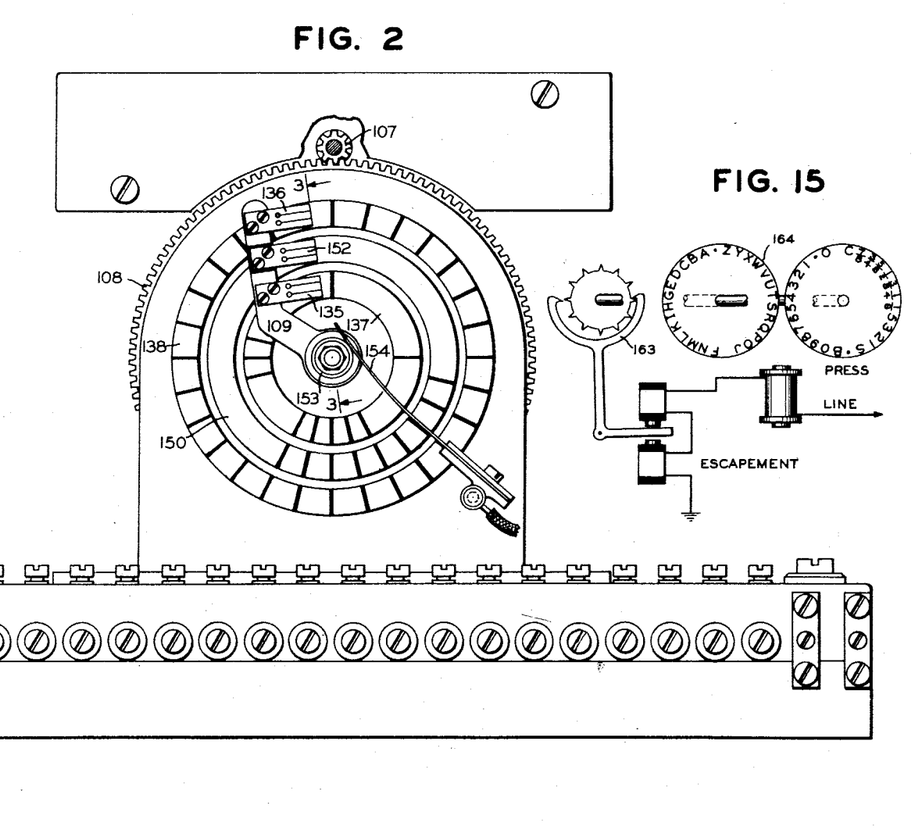
Figure 2 is an end elevation of the sunflower transmitter as viewed from the left of Figure 1.
Figure 3:
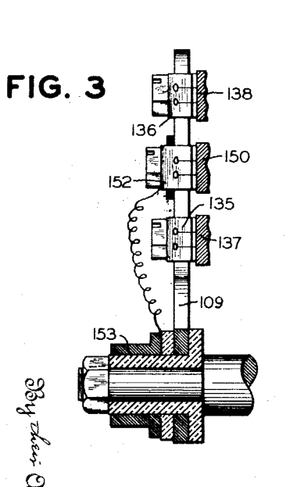
Figure 3 is a sectional view on the line 3—3 of Figure 2.
Figures 4, 5, 6:
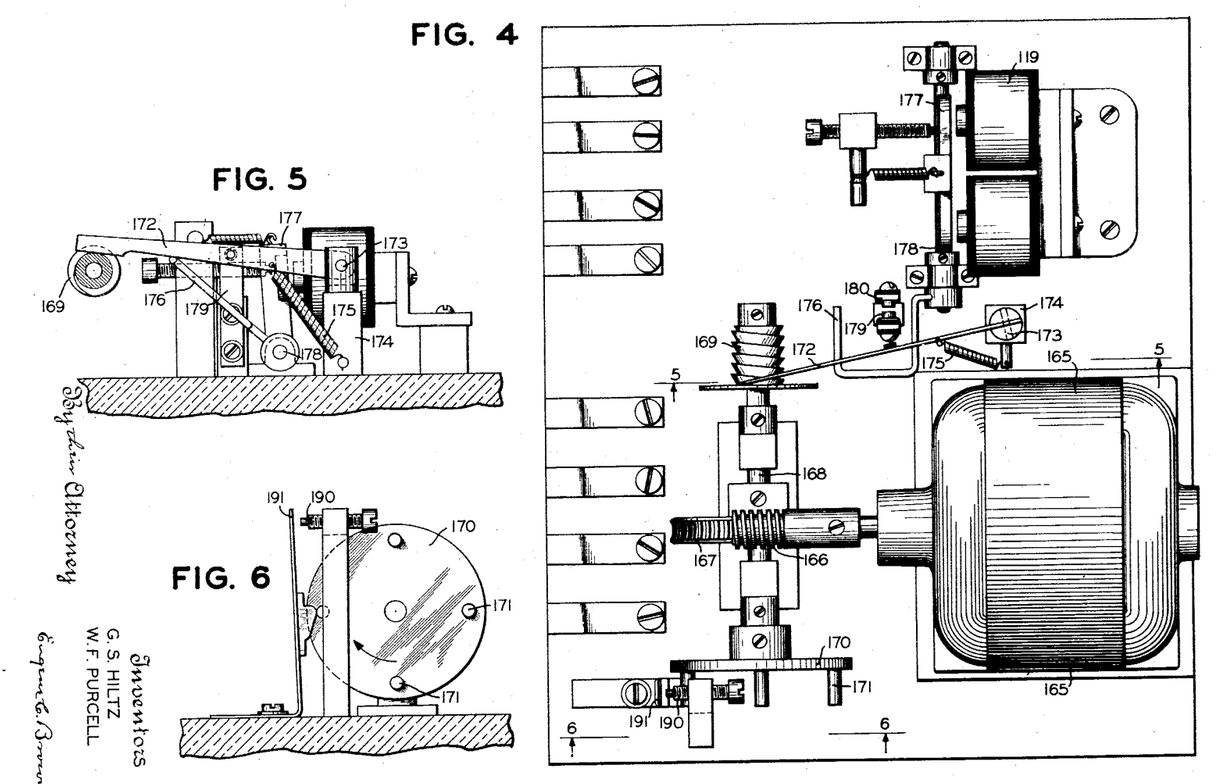
Figure 4 is a plan view of the unison device employed for bringing the sunflower brushes into unison with the ticker type wheels.
Figure 5 is a sectional view on the line 5—5 of Figure 4.
Figure 6 is a sectional view on the line 6—6 of Figure 4 showing the unison signal transmitting mechanism.

The sunflower transmitter is shown in Figures 1, 2 and 3 and comprises a constantly running motor 100 supplied with current from any suitable source through binding post 101 and a switch 102. It has field and armature rheostats 103 of conventional design for close control of speed. At one end of the motor is the commutator shaft 28 connected to the armature shaft 105 by a friction clutch 106 and connected by pinion 107 and a gear 108 to the shaft of the wiper or brush arm 109 to rotate the latter over the rings of the sun flower. The shaft 28 operates a commutator or pole changing switch comprising slip rings 110 and 111 (Figure 14) on the shaft, engaged by brushes 112, 113 and 114, the first brush being connected to the ground and the other two brushes being connected to the transmitting relays 115 and 116 respectively, the armature 117 of which is connected by conductor 118 through the winding of the unison magnet 119 (Figure 13) to the line 120. The armature 117 plays between a pair of contacts 121 and 122 connected to a positive and negative source of potential, respectively. The opposite terminals of the windings of the relays 115 and 116 are connected to a grounded source of potential 123. When the commutator is in the position shown in Figure 14, transmitting relay magnet 116 is energized, causing the relay armature to swing over against contact 121, thereby sending a positive impulse to the line. When the rotation of the commutator shaft 28 brings the insulating segment 124 into engagement with brush 114, the circuit is broken through the magnet 116 and closed through the magnet 115, thereby sending a negative impulse to the line.

These impulses operate the ticker escapement magnets at the receiving station and cause a step-by-step rotation of the ticker type wheels to bring the desired character into printing position. The escapement magnets have a short time constant and are, therefore, quick acting while the pressor printing magnet of the ticker, which is connected in series therewith, is slow acting. Consequently the press magnet is not sufficiently energized by the rapidly alternating impulses on the line to actuate its armature but is sufficiently energized by prolonging the last impulse (of whatever polarity it may be) and hence can operate the printing mechanism only after the type selecting movement of the type wheel has been completed.

On the commutator shaft 28, (Figure 14) is an electromagnetic clutch 125 which may be of the type shown in patent to John Burry, No. 549,420, issued June 4, 1895. This clutch has one terminal grounded at 126 and the opposite terminal connected by conductor 127 through the contacts 128 and 129, in parallel, of a clutch operating relay 130 and a clutch holding relay 131, to a grounded source of potential 132. The clutch, therefore, can be energized to arrest the commutator shaft and the brush arm 109 against the torque transmitted through the friction clutch 106 whenever the relays 130 or 131 are operated. It will be seen that so long as the clutch is de-energized the commutator will be rotated by the constantly running armature shaft 105 thereby sending alternating impulses to the line and that the brush arm 109 will be rotated over the sunflower in harmony with the commutator and in unison with the ticker type wheels.

Figure 14:
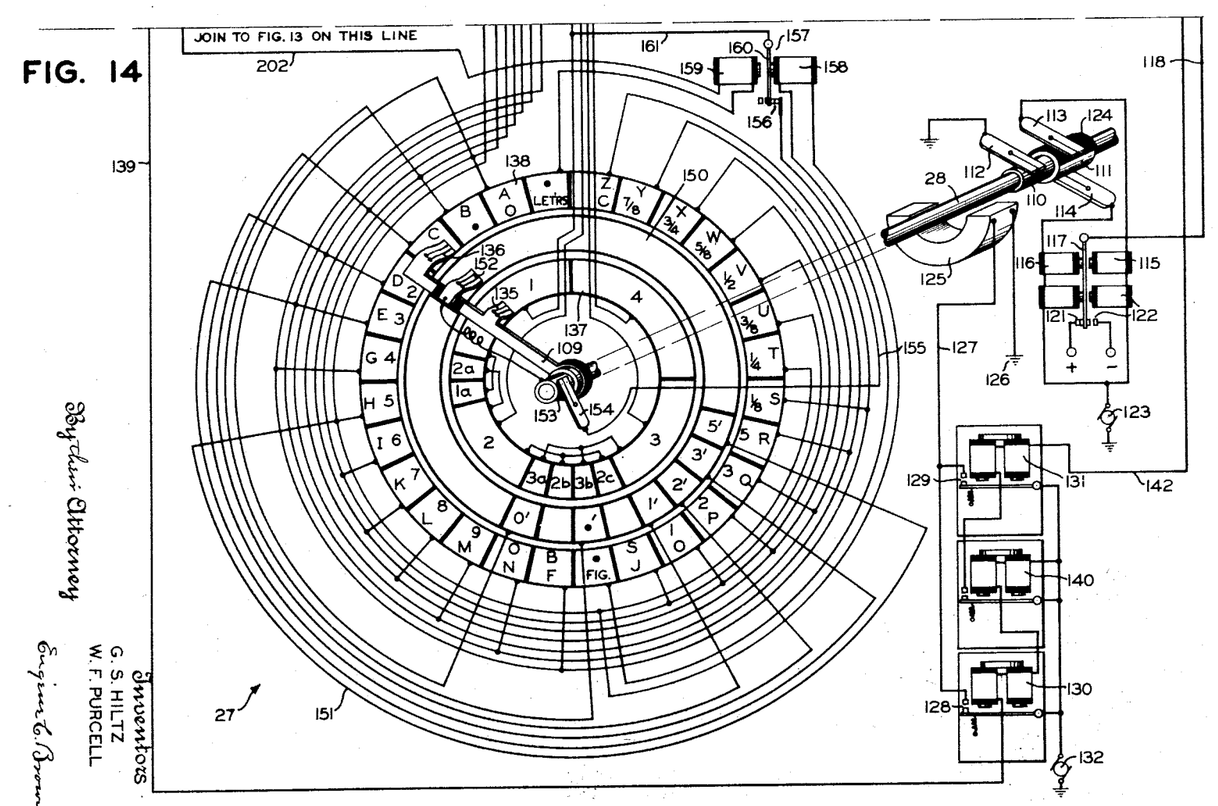

As shown in Figures 2 and 14 the brush arm 109, which is insulated from the commutator shaft 28, has two spring fingers 135 and 136, the former co-operating with an inner annular ring 137 and the other co-operating with an outer annular ring 138. The outer ring is divided into twenty-eight segments insulated from each other, two of which are shown marked with a period and the others with the twenty-six letters of the alphabet and certain numerals and fractions. The outer row of characters correspond to the characters appearing on one row of the type wheel and the inner row of characters correspond to those appearing on the other row of the type wheel. Each of the outer segments is connected in parallel with the seventh succeeding segment (counting in a counter-clockwise direction) thus forming what may be termed "sets" of segments and dividing the entire ring into as many groups as there are segments in each set. In the present embodiment there are four segments in each of the seven sets, making four groups of seven contacts each which, referring to the outer row of characters, are arranged as follows:

Letters period, A B C D E G; H I K L M N F;

Blank, J O P Q R S; T U V W X Y Z.

The segments of each of the seven sets are connected individually to the conductors of group 25 and thence to the stationary side of contacts 78 to 84 of the selector. For instance, as shown in Figures 13 and 14 the outer segments A, I, J, U constitute a set connected in parallel with each other but in series with selector contacts 79. Segments G, F, S, Z, form another set connected to selector contact 84. Thus each of the contacts 78 to 84 may be termed a set contact.

The inner ring 137 is divided into a number of segments 1, 1a, 2, 2a, 2b, 2c, 3, 3a, 3b and 4. Segments 1 and 1a are strapped together electrically and occupy one-quarter of the circumference of the ring. Segments 2, 2a, 2b and 2c are similarly strapped together and constitute another quarter of the ring. Segments 3 and 3b similarly constitute a third quarter. Segments 1 and 1a while not in juxtaposition may be considered as a quadrant, segments 2, 2a, 2b and 2c as a second quadrant, segments 3, 3a and 3b as a third quadrant and segment 4 as the fourth quadrant. These quadrants are individually connected by the group of conductors 26 to the four contacts 85 to 88 of the selector.

The inner quadrant 1 is common to a group of seven outer segments as are also quadrants 2, 3 and 4. The inner quadrants can, therefore, be conveniently termed "group segments." It is convenient to refer to the sunflower segments as "primary" contacts and to the selector contacts as "secondary" contacts. In Figure 14 the brushes 135 and 136 are shown engaging inner quadrant 1 and outer segment "C" respectively. These two are, therefore, bridged.

The movable side of contacts 78 to 88 (Figure 13) are connected to the common conductor 139 and thence (Figure 14) to the windings, in series, of the clutch operating relay 130 and tape transmitting relay 140 and thence to the source of potential 132. The movable side of selector contacts 85 and 88 are connected to the ground 95 by conductor 141 and the movable side of selector contacts 86, 87 and 89 are connected together.

The armature of tape transmitting relay 140 is connected to the source of potential 132 and controls a circuit including the winding of the clutch holding relay 131 and by way of conductor 142, the operating magnet 42 of the tape transmitter, one side of which is grounded.

Disregarding for the time the unison device 29 and assuming the type wheels of the receiving tickers to be shifted to the letters printing position and to be in unison with the brushes 135, 136, the operation of the transmitting mechanism will be described with reference to a particular example. At the instant shown in Figures 13 and 14 there is no code combination set up in the tape transmitter and all of the selecting relays 43 to 48 are de-energized. Selector contacts 78 to 84 are, therefore, all open and none of the circuits to the outer ring of segments are completed. The circuit of clutch operating relay 130 is, therefore, open and the clutch 125 is de-energized permitting the shaft 28 to rotate continuously thus transmitting uninterrupted current alternations to the line.

Assuming now that the letter S is to be printed. As previously stated upon setting up of the letter S code combination in the tape transmitter, selecting magnets 45, 46 and 48 are energized shifting code bars 58, 59 and 61 and closing selector contacts 84 and 86 and opening contact 88. A circuit may then be traced from the ground 95 through selector contacts 89 and 86 to quadrant 3 of the inner ring, thence (upon movement of brush 136 onto segment marked S) from segment S through one conductor of group 25 to selector contact 84, the circuit being continued by conductor 139 through the windings of relays 130 and 140, to the source of potential 132. Relay 130 being thus operated, the contact 128 closes and completes a circuit to the clutch 125 thus stopping the transmitting shaft 128 with the brush 136 on segment S. Since the typewheels of the receiving tickers operate in unison with the brush 136, the typewheels are also brought to rest with the letter S in printing position.

Relay 140 operates at the same time to complete a circuit from the generator 132 through the winding of the clutch holding relay 131, conductor 142 and operating magnet 42 of the tape transmitter, thus causing the tape to be stepped ahead and a new code combination to be set up through the contacts of the selector, thereby interrupting the circuit to the relay 130 and opening the circuit to the clutch 125 through the relay contact 128. Relay 131 is designed, however, to retain the clutch circuit closed through its contact 129 for a sufficient interval to cause a prolonged impulse to be transmitted to the line to operate the printing magnets of the receiving tickers. Upon release of relay 131, the shaft 128 is again free to rotate the brush 136 to the succeeding position.

As new code combinations are successively set up on the segments of the sunflower, the type wheel will continue to print from the letters row. When it is desired to print from the figures row, the figures period is first transmitted which actuates the shift mechanism of the tickers to shift the printing to the figures row of type as is explained in detail in the aforesaid patent to Hiltz, No. 1,085,124. Succeeding code combinations set up on the sunflower segments are then printed from the figure row of the type wheel.

By reference to Figure 14 it will be noted that certain often used characters as 0, period, 1, 2, 3 and 5 are repeated on the letters row, on substantially opposite sides of the outer ring and they are repeated in similar positions on the type wheels as shown diagrammatically in Figure 15. It is desirable for high speed operation to cause printing to be effected from the particular one of these characters which first reaches printing position during the rotation of the type wheels. For this purpose a third or intermediate ring 150 is provided on the sunflower with insulated segments indicated as 0', .', 1', 2', 3' and 5' disposed opposite one set of segments bearing these unprimed characters in quadrant 3 and connected by conductors 151 to the other set of segments bearing corresponding characters. Ring 150 is traversed by a brush 152 carried by the brush arm 109 and insulated from the brushes 135 and 136. Brush 152 is electrically connected to a slip ring 153 on the brush arm shaft engaged by a brush 154 which is connected by a conductor 155 to one contact 156 of a relay 157 having two opposed magnets 158 and 159. The armature 160 of the relay 157 is connected by conductor 161 to the conductor of group 26 associated with quadrant 1 (segments 1 and 1a) of the inner ring. The letter period segment (located opposite quadrant 1) is connected through the winding of magnet 159, conductor 202 and the contacts 219 and 210 of the manual switch 30, to selector contact 78 and the figures period segment (located opposite quadrant 3) is connected through the winding of magnet 158, directly to selector contact 78.

It will be noted that the repeated characters all appear in their normal position opposite quadrant 1, that is on outer segments disposed opposite segments 1 and 1a of the inner ring, and that these characters appear again in their secondary position, opposite quadrant 3, that is opposite segments 3, 3a and 3b of the inner ring. The particular arrangement of characters shown on the sunflower is controlled by the arrangement of the characters on the ticker typewheels of an extensive ticker system. It is therefore, for the purpose of enabling the segments, corresponding in angular position to the duplicated characters on the type wheels, to be disposed adjacent opposite quadrants of the inner ring that the inner ring is provided with a number of small segments electrically connected into the equivalent of four continuous quadrants.

In making a selection for one of the duplicated characters the particular segment disposed opposite quadrant 1 is selected through the contacts of the tape control selector and the printing wheel is caused to print from whichever character first reaches printing position.

The operation of this portion of the apparatus is as follows: Assuming the letters period to be selected by closing of selector contacts 78 and 88; as brush 136 passes on to the letters period segment a circuit is completed from the ground 95, selector contact 88, quadrant 1, brushes 135 and 136 to the letter period segment, thence to the winding of the magnet 159, through the closed contacts of the manual switch 30 to the selector contact 78, and thence by conductor 139 to the clutch operating relay 130. Armature 160 of the relay 157 is thus drawn over against its dead contact 158 opening the circuit to the intermediate ring 150. The subsequent passage of the brush 152 over this ring, therefore, has no effect on the operation of the transmitter and the brush 136 may be stopped on any of its segments depending upon the code combination set up through the selector contacts, to control the printing of letters characters.

Upon the selection of the figures period, however, a similar circuit is completed from the ground 95 through the selector contacts 89 and 86 to quadrant 3 of the inner ring, thence by brushes 135 and 136 to the figure period segment from which point the circuit is continued through the winding of magnet 158 to the selector contacts 78 and 77, and thence by conductor 139 to relay 130. Magnet 158 thus draws its armature over against contact 156 connecting the intermediate ring 150 to quadrant 1 of the inner ring. Assuming now that the next character to be printed is numeral 3, selected, of course, in quadrant 1 by closing of selector contacts 83 and 88. The brush 136 as it revolves counter-clockwise from the figures period first engages a segment bearing the numeral 3 in quadrant 3 and it is, therefore, desired to print from the typewheel in its corresponding position rather than to step it around to the angular position of segment bearing character 3 in quadrant 1. The circuit for effecting this result may be traced from the ground 95 through selector contact 88, conductor 161, armature 160, contact 156, conductor 155 and brushes 154 and 152 to segment 3' of the intermediate ring, thence by one conductor of group 151 and the conductor of group 25 connected thereto to selector contact 83 and by conductor 139 to the clutch operating relay 130. The brush is thus stopped on the segment bearing the numeral 3 in quadrant 3 and printing is effected from the corresponding position of the ticker typewheel. Should the next character be numeral 2, brush 136 will revolve into contact with segment bearing numeral 2 in quadrant 1 at which point it will be stopped by completing the normal control circuit, that is independent of the intermediate ring 150. Thus, in whatever position the brush arm may be, when a code combination for one of the duplicated numerals is set up, the brush arm will stop on the first segment to be reached bearing the character to be printed.

The alternating current impulses actuate an escapement mechanism 162, of the receiving printer (Figure 15) permitting the ticker typewheels 163 to rotate step-by-step under the driving power of a spring motor (not shown) which is wound by the printing impulses. When a sufficient number of current alterations are received without a prolonged or printing impulse, the type wheels are automatically brought to rest with a definite character or symbol, as the letters period, in printing position. To restore the type wheels to unison, provision is made for transmitting the requisite number of impulses from the sunflower commutator to thus set the type wheels in their unison position and at the same time to stop the sunflower brush in its corresponding position, that is, on the letter period segment.

The tickets are so designed that normally the printing impulses are sufficient to maintain the spring motors wound but through improper adjustment or other defects some of the tickers may at intervals require additional winding impulses. The unison device 29 is, therefore, provided for the double purpose of controlling the transmission of unison signals and for transmitting winding impulses to the receiving tickers at the will of the transmitting operator.

Referring to Figures 4, 5, 6 and 13, the unison device comprises a constantly running motor 165, the shaft of which is geared by a worm 166 and wheel 167 to a transverse shaft 168. Shaft 168 has, on one end, a worm or screw 169 and on the other end, a disc 170 carrying four pins 171. A lever 172 is pivoted to rock on a horizontal axis in a stud 173 pivoted in the vertical post 174, the lever being thus capable of universal swinging movement. The lever is urged downward into engagement with the screw 169 and also towards the right (Figure 13) by a spring 175. It is adapted to be lifted from contact with the screw by a U-shaped extension 176 of the armature 177 of the unison magnet 119. Armature 177 is pivoted at 178. When so raised, the spring 175 returns the lever 172 to the right hand end of the screw. The lever 172 as it is swung to the left by the screw 169 engages a spring contact 179 and carries it into engagement with a contact 180. These contacts 179, 180 are normally open and serve when closed to complete the circuit to the clutch operating relay independently of the selector contacts, to stop the sunflower brush arm in the unison or letters period position, as will be fully explained hereinafter.

The pins 171 on the disc 170 engage with one of a pair of contacts 190 and 191 to open and close the same four times during each revolution of the disc.

Figure 13:
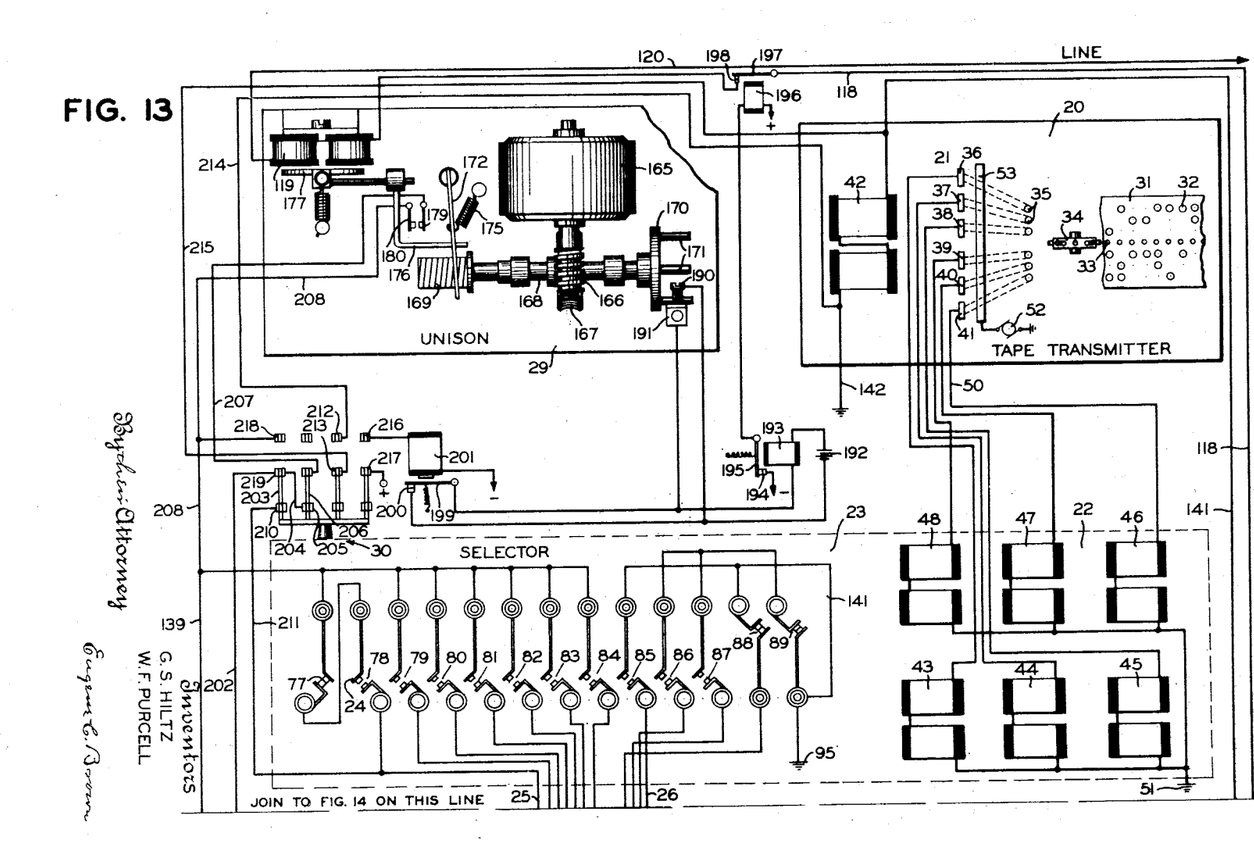
Figure 13 is a diagrammatic view of a part of the transmitting mechanism and control circuit showing the tape transmitter, multi-contact selector, unison device and the manual control switch for the unison device; and, Figure 14 is a diagrammatic view of the sunflower and the control and transmitting relays and the circuit arrangement therefor, this view being a continuation of Figure 13.

Referring to Figures 13 and 14 the circuit arrangement for the unison and winding devices is shown. These devices are controlled by the double throw, four pole switch 30. Contact 190 is connected to one terminal of the battery 192 and contact 191 joined to one terminal of the winding of a relay 193, the other terminal of which is joined to the opposite side of the battery. Contact 194 of the relay is associated with a source of potential and the armature 195 is connected to the other side of the source of potential through the winding of a relay 196. The armature 197 and front contact 198 of relay 196 is in series with the conductor 118 and controls the opening and closing of the outgoing line 120. Contacts 190 and 191 are normally shunted by the armature 199 and back contact 200 of a magnet 201. With the switch 30 on the printing side in the position shown in Figure 13 and with the motor 165 of the unison device running, the winding mechanism remains inoperative since the contacts 190 and 191 are bridged by the contacts of magnet 201. The transmitting mechanism then operates in its normal manner as previously described.

Unison may be established between the typewheels and the sunflower brush, either manually through opening of the switch 30 or automatically under the control of the tape by leaving a blank or unperforated space in the tape. These blank spaces may be provided at intervals in order to periodically bring the transmitter and printing mechanism into unison. When such a blank portion of the tape comes into position above the pins of the tape transmitter all of the transmitter contacts 21 are held open and all of the selecting magnets 22, therefore, remain unenergized. Consequently, no selection is set up on the selector contacts. The sunflower brush arm 109 is thus caused to rotate continuously sending out current alternations which eventually bring the ticker type wheels to rest in unison position. Since there are no printing or prolonged impulses transmitted during this period the arm 172 of the unison device is permitted to travel to the left end of the screw 169, closing the contacts 179, 180. This occurs only after a sufficient number of alternations have been transmitted to bring the type wheels to rest in unison position. When the contacts 179, 180 close, a circuit for the letters period (unison position) is completed from the ground 95, normally closed selector contact 88, quadrant 1, brushes 135, 136 and letters period segment of the sunflower, magnet 159 and conductor 202 to switch blade 203 of the manual switch 30, thence by conductor 204 to switch contact 205, blade 206, conductor 207, closed contacts 179 and 180 of the unison device and conductors 208 and 139 to the clutch operating relay 130. The clutch 125 is thus operated to bring the brush of the sunflower to rest on the letters period segment. The tape is then stepped ahead in the normal manner and the transmission proceeds.

Suppose the operator (who usually has before him a ticker in series with the distant tickers) observes that his ticker is out of unison. He may manually restore them into unison by opening the switch 30 thus interrupting the letters period circuit which is normally completed through the switch blade 203, contact 210 and conductor 211 to the selector contacts. The tape contains a number of "letters period" perforations for spacing the words or numbers apart. Evidently the opening of the switch 30 cannot have any effect upon the operation of the transmitter until the next "letters period" perforations come to the contacts 21 of the tape transmitter. When this happens the letters period circuit is not closed, since there is a break in it at the switch 30. Consequently, the brush arm does not stop on the letters period segment but keeps on rotating, thereby sending alternating impulses over the line which cause the ticker type wheels to rotate until brought to rest by the ticker unison mechanism with the letters period at the compression point. After a sufficient time has elapsed for this to occur, switch 30 is again closed to the printing side (as shown in Figure 13) and since the letters period combination is still set up on the selector contacts, the sunflower brush arm is brought to rest in unison position and transmission is automatically resumed with the tickers and transmitting apparatus in unison.

In order to transmit winding impulses the switch 30 is first opened to produce a unison condition as just described and then closed on the winding side (the upper side in Figure 13). Upon the bridging of contacts 212 and 213 the operating magnet 42 of the tape transmitter is immediately short circuited through conductors 214 and 215, thus preventing operation thereof during the transmission of the winding impulses. Upon bridging of contacts 216 and 217, the magnet 201 is energized opening the shunt across the contacts 190, 191 of the winding mechanism, thus permitting relay 193 to respond to the opening and closing of these contacts. Relay 193 in turn operates relay 196 to open and close the line 120 thus sending current interruptions of constant polarity, the polarity depending upon the setting of the armature 117 of the transmitting relay at the particular time. Since these impulses are all of the same polarity as the last transmitted alternations, the polarized relays controlling the ticker type wheels remain unoperated and the ticker type mechanism is not actuated. These impulses are of sufficient strength and duration, however, to actuate the winding mechanism of the tickers. The bridging of contacts 218 and 219 of switch 30 also stops the sunflower brush and retains it in unison position during the transmission of the winding impulses through a circuit extending from the ground 95, selector contact 88, quadrant 1, brushes 135, 136 and letters period segment of the sunflower, and thence by conductor 202, switch blade 203, contact 218 and conductors 208 and 139 to the clutch operating relay 130. The system is restored to normal operation by returning switch 30 to the printing side.

It should be noted that an arrangement has been produced whereby the alternating impulses or step-by-step signals of variable numbers for each character may be transmitted under the control of a tape perforated in accordance with a definite and fixed character code of six units, thus permitting standard narrow tape perforators and tape transmitters to be employed. The translation from one type of signals to the other is accomplished entirely through the selector 23 without any intermediate relays. The selector 23 involves no rotating parts and is rapid and reliable in operation. It should be further noted that unison may be effected automatically under the control of the tape or manually through the manipulation of the switch 30 and that this same switch controls the application of winding impulses to the outgoing line. Another feature of the invention is the printing of characters duplicated on different parts of the typewheel in whichever position first reaches the printing point.

Obviously, various modifications may be made in the construction of the mechanism described and illustrated and in the control circuits therefor without departing from the spirit or essential attributes of the invention and consequently we do not desire to be limited to the exact details shown and described except in accordance with the appended claims.

What we claim is:

1. An automatic printing telegraph system, comprising a storage transmitter controlled by a predetermined character code, a selector having a plurality of contacts, said selector being controlled by the storage transmitter to set up the contacts thereof in combinations in accordance with a different predetermined character code.

2. An automatic printing telegraph system, comprising a storage transmitter controlled by a predetermined character code, a selector having a plurality of contacts, said selector being controlled by the storage transmitter to set up the contacts thereof in combinations in accordance with a different predetermined character code, and means for transmitting current alternations to a transmission line, said means being controlled by selective circuits completed through said selector contacts.

3. An automatic printing telegraph system, comprising a storage transmitter controlled by a predetermined character code, a selector having a plurality of contacts, said selector being controlled by said storage transmitter to set up the contacts thereof in combinations in accordance with a different predetermined character code, a transmitter adapted to send current impulses over a transmission line, a sunflower therefor, a rotary brush engaging said sunflower and means including said selector contacts for completing selective circuits through said sunflower to stop the brush in predetermined positions.

4. In a printing telegraph system, in combination, a transmitter for sending current alternations over a transmission circuit, a plurality of transmitter control circuits selectable in pairs to determine the current sending operation of the transmitter, automatic contact mechanism for opening and closing said control circuits in pairs and a tape transmitter operating on a permutation code for controlling said contact mechanism.

5. In a printing telegraph system, in combination, a transmitter for sending current alternations over a transmission circuit, a plurality of transmitter control circuits selectable in pairs to determine the current sending operation of the transmitter, electromagnetically operated contact mechanism and a tape transmitter for controlling the operation of said contact mechanism.

6. A printing telegraph system comprising transmitting mechanism adapted to send current impulses over a transmission line, controlling means therefor including a sunflower having outer segments electrically connected in sets and arranged in groups, and inner quadrants associated with the respective groups, a rotating brush engaging the quadrants and outer segments to bridge the same, a group of selector contacts connected individually to the aforesaid sets of outer segments, a second group of selector contacts connected individually to said inner quadrants, and a tape transmitter, having a less number of contacts than the number of said selector contacts, for operating said selector contacts to complete selecting circuits through said sunflower.

7. A printing telegraph system comprising twenty-eight selectable transmission control circuits completed by differently connecting seven set circuits and four group circuits, a selector having eleven controlling contacts for said circuits, seven contacts being associated individually with the seven set circuits and the remaining four contacts being associated individually with the four group circuits, whereby any desired circuit can be selected by combining appropriate contacts in pairs, and a tape transmitter having a number of selecting elements less than the number of said selector contacts, for operating said selector contacts in pairs.

8. A printing telegraph system comprising transmitting mechanism having a sunflower provided with inner and outer segments and a rotating brush bridging said segments, each inner segment being common, electrically, to an equal number of a plurality of outer segments, means for closing a transmission control circuit through a selected inner segment, the brush and a selected outer segment, said means comprising a selector and a tape transmitter operating on a code of not more than six units for controlling said selector.

9. In a printing telegraph system, in combination, a transmitter having a rotating commutator for sending current impulses in succession over a line, a sunflower provided with inner quadrants, outer segments electrically connected to form sets, in groups common to the inner quadrants individually, each set of outer segments being equal in number to the number of outer segments in each of the other sets, a brush rotating in harmony with the commutator to bridge the inner quadrants and outer segments, electro-magnetic means for stopping the commutator and brush, and means under the control of a tape, perforated in accordance with a permutation code, to close a control circuit for said electro-magnetic means through a selected inner quadrant, the brush, and a selected outer segment.

10. In a printing telegraph system a transmitter, a transmission line and a distant receiver, means at said transmitter for controlling the transmission of controlling current over a line, said means including a sunflower having a rotating brush, a selector for completing a plurality of control circuits through said sunflower for controlling the operation of said transmitter and a tape transmitter, operated in accordance with a permutation code, for controlling said selector.

11. A printing telegraph system comprising a storage transmitter controlled by a permutation code of not more than six units, a sunflower transmitter for sending current alternations over a transmission line to control a distant receiver according to the number of impulses transmitted and a non-rotary selector mechanism controlled by said storage transmitter for completing selective circuits through said sunflower to determine the operation of the sunflower transmitter.

12. In a printing telegraph system, a sunflower transmitter for sending current impulses to a transmission line, contact mechanism for completing selective control circuits through said sunflower to determine the operation of said transmitter, said contact mechanism comprising a plurality of contacts, a number of code members less in number than the number of contacts for operating said contacts and tape controlled means for actuating said code members.

13. A selector for a printing telegraph system comprising a plurality of set contacts and a plurality of group contacts, and code members operable in each position thereof to operate one of said set contacts and one of said group contacts.

14. In a printing telegraph system, a type wheel printer having a character occuring in a plurality of different positions on said type wheel, a signal transmitter for effecting rotation of said type wheel, and means, responsive to a single selecting condition representative of said character for causing said type wheel to print from the first of said duplicated characters to reach printing position.

15. In a printing telegraph system, a type wheel printer having duplicate characters occurring in a plurality of different positions on said type wheel, a sunflower transmitter for sending current impulses over a transmission line to control a distant receiver according to the number of such impulses so sent, said sunflower having segments corresponding to each printing position on said type wheel, means for completing selective control circuits through the sunflower segments to determine the operation of said transmitter, said sunflower operating upon the completion of a single selective circuit, representative of said duplicated character, for causing said type wheel to print from the first of said duplicated characters to reach printing position.

16. In a printing telegraph system, a type wheel printer having two annular sets of characters disposed in corresponding angular positions thereon, one of said sets of characters having certain characters duplicated in different positions, a sunflower transmitter for sending current impulses over a transmission line to control a distant receiver according to the number of impulses so sent, said sunflower having segments corresponding to each of said angular positions, means for completing selective circuits through the segments of said sunflower to control the operation thereof for effecting printing selectively from either of said sets of characters, and means responsive to a single selective circuit representative of one of said duplicated characters for causing printing from the first of said duplicated characters to reach printing position.

17. In a type wheel printer, a type wheel having certain characters duplicated thereon in normal and secondary positions, a sunflower transmitter for sending current impulses over a transmission line to control a distant receiver according to the number of such impulses so sent, said sunflower having a ring provided with segments corresponding to each printing position of said type wheel, a second ring having segments corresponding to the secondary position of each of said duplicated characters, means for completing selective circuits through each segment of said first ring and selectively operated means for completing such of said circuits as extend to segments corresponding to the normal position of the duplicated characters, in parallel thereto through the segments of the second ring corresponding to the secondary position of said duplicated characters.

18. In a type wheel printer, a type wheel having a row of letter characters and a row of figure characters arranged in corresponding angular positions, said set of figure characters having certain characters duplicated thereon in normal and secondary positions, a sunflower transmitter for sending current impulses over a transmission line to control a distant receiver according to the number of such impulses so sent, said sunflower having a ring provided with segments corresponding to each angular position of the type wheel, a second ring having segments corresponding to the secondary position of each of said duplicated characters, means for completing selective circuits through each of said first segments, and selectively operated means for completing certain of said circuits in parallel through the segments of said second ring.

19. In a type wheel printer, a type wheel having a row of letter characters and a row of figure characters arranged in corresponding angular positions, said set of figure characters having certain characters duplicated thereon in normal and secondary positions, a sunflower transmitter for sending current impulses over a transmission line to control a distant receiver according to the number of such impulses so sent, said sunflower having a ring provided with segments corresponding to each angular position of the type wheel, a second ring having segments corresponding to the secondary position of each of said duplicated characters, means for completing selective circuits through each of said first segments, selectively operated means including a relay contact, for completing certain of said circuits in parallel through the segments of said second ring, and means including certain of said selective circuits for operating said relay.

20. A printing telegraph system comprising a receiving printer, a transmitter for sending current alternations to a line to operate said printer, impulsing means for sending winding impulses of constant polarity to said line and means for rendering said transmitter inoperative during the period of operation of said impulsing means.

21. A printing telegraph system comprising a receiving printer, a tape controlled transmitter for sending current alternations to a line to operate said printer, a winding device for transmitting winding impulses to said printer and means for stopping said transmitter in unison position rendering said winding mechanism effective to transmit winding impulses to the printer and for maintaining the transmitter in unison position during the transmission of said winding impulses.

22. In a printing telegraph system, a sunflower transmitter for sending current alternations to a line, a tape transmitter for controlling the operation of the sunflower transmitter, a pulsing device for sending winding impulses to the line and a switch having two positions of operation, said switch in one position rendering said tape transmitter and sunflower transmitter operative and said pulsing device inoperative and in the other position rendering said tape transmitter and sunflower transmitter inoperative and said pulsing device operative.

23. In a printing telegraph system, a sunflower transmitter for sending current alternations to a transmission line, a tape transmitter for controlling the operation of said sunflower transmitter, a pulsing device for sending winding impulses to the line and a switch having an open and two closed positions, said switch in one closed position rendering said pulsing device inoperative and said tape transmitter and sunflower transmitter operative to transmit printing signals, said switch in its open position causing said transmitter to transmit unison signals and said switch in its other closed position rendering said tape transmitter and sunflower transmitter inoperative and said pulsing device operative to transmit winding impulses.

24. A selector for a printing telegraph system comprising a plurality of code bars, means for shifting said bars in accordance with a permutation code, a plurality of contacts adapted to be operated by said code bars, said contacts being arranged in two groups, said code bars in each active combination thereof operating contacts of each group, and selective circuits completed through a single operated contact of each group.

25. A selector for a printing telegraph system comprising a plurality of code bars, means for shifting said bars in accordance with a permutation code, a plurality of contacts adapted to be operated by said code bars, said contacts being arranged in two groups, said code bars in each active combination thereof operating contacts of each group, the number of contacts operated in each group being less than the number of units of said permutation code, and selective circuits completed through the operated contacts of each group.

In testimony whereof we affix our signatures.

GEORGE S. HILTZ.
WILLIAM F. PURCELL.